United States Patent [19]
Onsager

[11] 3,759,983
[45] Sept. 18, 1973

[54] COUPLING OF ORGANIC COMPOUNDS
[75] Inventor: Olav T. Onsager, Waldwick, N.J.
[73] Assignee: Halcon International Inc., New York, N.Y.
[22] Filed: Dec. 9, 1971
[21] Appl. No.: 206,542

Related U.S. Application Data
[60] Division of Ser. No. 872,395, Oct. 29, 1969, Pat. No. 3,644,477, and a continuation-in-part of Ser. No. 801,757, Feb. 24, 1969, Pat. No. 3,644,474, and a continuation-in-part of Ser. No. 801,758, Feb. 24, 1969, Pat. No. 3,644,473, and a continuation-in-part of Ser. No. 835,722, June 23, 1969, Pat. No. 3,644,476.

[52] U.S. Cl. .......................... 260/485 R, 260/537 R
[51] Int. Cl. ...................... C07c 55/14, C07c 69/44
[58] Field of Search ...................... 260/485 R, 537 R

[56] References Cited
UNITED STATES PATENTS
2,606,204 8/1952 Hogsed et al. .................. 260/465.8

Primary Examiner—Lorraine A. Weinberger
Assistant Examiner—E. Jane Skelly
Attorney—William C. Long et al.

[57] ABSTRACT

A process for the reductive coupling of a compound having the formula

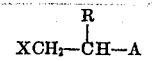

wherein X is Cl, Br, or I, R is H or lower alkyl, and A is

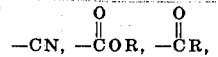

or $-CONR_2$, using as reducing agent a zero valent reducing metal or compound thereof in combination with a promoter salt. The invention especially relates to an overall process for the production of linear dimers of compounds of the formula

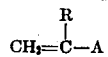

by first hydrohalogenation to

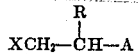

followed by the reductive coupling.

13 Claims, No Drawings

COUPLING OF ORGANIC COMPOUNDS

This case is a divisional of Ser. No. 872,395 filed Oct. 29, 1969, now U. S. Pat. No. 3,644,477, which is a continuation-in-part of Ser. No. 801,757 filed Feb. 24, 1969, now U. S. Pat. No. 3,644,474, and Ser. No. 801,758 filed Feb. 24, 1969, now U. S. Pat. No. 3,644,473, and Ser. No.835,722 filed June 23, 1969, now U. S. Pat. No. 3,644,476.

BACKGROUND OF THE INVENTION

This invention relates to a process for the reductive coupling of particular halo organic compounds and in particular provides a process for the preparation of valuable compounds such as adiponitrile starting with inexpensive and readily available compounds such as acrylonitrile.

Adiponitrile is a chemical of very great potential importance since it is easily converted to hexamethylene diamine by straightforward procedures. Hexamethylene diamine is, of course, a component of nylon 6, 6.

Presently, the bulk of hexamethylene diamine is prepared by the costly route of first preparing adipic acid and subsequently converting the adipic acid to hexamethylene diamine. In view of the high expenses associated with the adipic acid route, those skilled in this art have devoted much time and energy to devising other, less costly routes.

Acrylonitrile has become a cheap and readily available chemical and great efforts have been expanded in order to successfully prepare adiponitrile from acrylonitrile, via linear dimerization of hydrodimerization procedures. However, such methods have not proved completely successful since in linear dimerizations yields are very low and high amounts both of polymer and of the branched dimer tend also to be produced. In U.S. Pat. No. 3,225,083, for example, linear dimerizations are taught using aromatic tertiary phosphine catalysts but these produce at best only minor amounts of linear dimer. Hydrodimerizations produce better yields of adiponitrile but inevitably high amounts of propionitrile are also produced thus rendering the process as economically unattractive. For example, British Pat. No. 1,079,696 shows dimerization using a ruthenium catalyst with yields of linear products less than 50 percent based on consumed acrylonitrile.

Hydrodimerizations have also been taught using alkali metal amalgams but low yields and great inefficiencies have been major disadvantages. U.S. Pat. No. 3,215,726 seeks to provide an improvement by using beta-halopropionitrile in combination with acrylonitrile in the alkali metal amalgam system but still shows high production of propionitrile and poor yields of adiponitrile despite the use of expensive procedures and reagents. Electrolytic hydrodimerization procedures suffer from the problems inherent in electrolytic cell usage — proportional capital cost for increase capacity insofar as the electrolytic cells are concerned, and high power costs.

The extension of carbon chains by the reductive coupling of two groups is well known in the art. Organic coupling has been accomplished for example by the well known Wurtz reaction wherein an organic halide is coupled in the presence of metallic sodium. Similarly, organic halo compounds activated by groups such as allylic, benzylic, gem di-halides and 1, 2 dihalides have been coupled.

For example, in British Pat. No. 858,514 the coupling of chloro substituted allylic cyano compounds is shown. However, the coupling of non-activated halo-compounds is not shown.

SUMMARY OF THE INVENTION

In accordance with the present invention, an organic compound having the formula

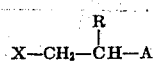

is coupled by reaction in the liquid phase at about 50° – 250° C. to produce the coupled product

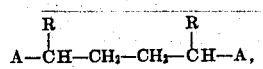

A being

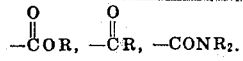

or -CONR$_2$, R being hydrogen or lower alkyl (1 to 4 carbon atoms), and X being chloro, bromo or iodo. In by far the most preferred embodiment, adiponitrile is prepared by the coupling of 3-halopropionitrile, especially 3-bromopropionitrile.

In a particular practice, the above coupled product is prepared from the unsaturated compound

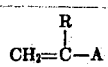

by the steps of reacting said unsaturated compound with HX to produce

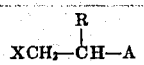

followed by the coupling of this latter product. The compounds

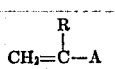

wherein R and A are as above indicated undergo anti-Markownikoff addition of HX and this is essential in order to produce the halo-organic product which is coupled to form the saturated linear derivative of the above said unsaturated material.

Although, the invention has wide applicability, in an especially advantageous practice there is provided a procedure for producing adiponitrile i.e., N≡C—CH$_2$—CH$_2$—CH$_2$—CH$_2$—C≡N, from 3-halo propionitrile. It will, of course, be understood that the adiponitrile is readily converted to hexamethylene diamine by known techniques.

DETAILS OF THE INVENTION

A. The Halo Organic Compound

The halo organic compound has the formula

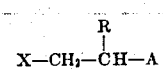

wherein X is chloro, bromo, or iodo, R is hydrogen or C$_1$—C$_4$ alkyl, and A is -CN,

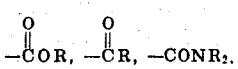

Examples are 3-bromopropionitrile, 3-chloropropionitrile, 3-iodopropionitrile, 3-bromo-2methyl propionitrile, 3-chloro-2-methyl propionitrile, 3-iodo-2-methyl propionitrile, 3-bromopropionic acid, 3-chloropropionic acid, 3-iodo-propionic acid, 3-bromo methyl propionate, 3-chloro methyl propionate, 3-iodo methyl propionate, 3-bromo propionamide, 3-chloro propionamide, 3-iodo propionamide, methyl (2-bromoethyl) ketone, methyl (2-iodoethyl) ketone, methyl (2-chloroethyl) ketone.

B. Preparation of the Halo Organic Compound

The halo-organic compounds which are coupled in accordance with the present invention, are most suitably prepared by hydrogen halide addition to the unsaturated precursor, i.e.,

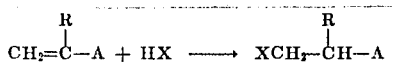

$$CH_2=\overset{R}{\underset{|}{C}}-A + HX \longrightarrow XCH_2-\overset{R}{\underset{|}{CH}}-A$$

wherein X, R and A are as above described. Of course, other methods are possible and could be used in carrying out the present invention.

The hydrogen halide addition is advantageously carried out by passing hydrogen halide into contact with liquid unsaturated precursor at moderate conditions, i.e., at 10° – 100° C. for example. The hydrogen halide may be liquid or vapor.

All vapor phase techniques can be employed but these are not preferred.

Catalysts such as described in U.S. Pat. No. 2,524,020, for example, can be employed.

Preferably, the gaseous hydrogen halide is passed into the liquid unsaturated compound until the addition reaction substantially ceases, e.g., 5 minutes to 10 hours, and thereafter the product beta halocompound

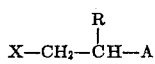

$$X-CH_2-\overset{R}{\underset{|}{CH}}-A$$

is recovered by straightforward distillation.

C. The Reducing Agent

The reductive coupling of the present invention is carried out in the presence of a coupling composition comprised of two essential components, i.e., a coupling agent selected from the group consisting of Cr, Mn, Fe, Co, Ni, Cu, Zn, Ag, Cd, In, Sn, Sb, Te, Hg, Tl, Pb, and Bi used either as the metal or as a zero valent compound of the metal such as the carbonyl together with, as the second component, a promoting salt. Additionally, compounds of Cr, V and Ti where the Cr, V, and Ti are in the lower valence state, i.e., $Cr^{+2}$, $V^{+2}$ and $Ti^{+2}$, can also be used as coupling agent.

As an essential aspect of the present invention, the provision of the promoting salt in the coupling composition has certain important effects. In the first place, the promoting salt greatly improves the rate of the coupling reaction, thus reducing reaction times and induction periods. As an additionally essential effect, the use of the promoting salt greatly improves the selectivity of the coupling to the desired product. In fact, through the use of the promoting salt various coupling metals can be employed which are substantially ineffective in the coupling in the absence of the promoting salt.

The promoting salts are salts (preferably anhydrous), which have substantial solubility in the reaction system, e.g., at least to the extent of 0.1 percent by weight and preferably at least 1 percent by weight. The cation of the salt can be an ammonium, phosphonium, alkyl ammonium or alkyl phosphonium group but preferably is lithium, magnesium, titanium, vanadium, chromium, manganese, iron, cobalt, nickel, copper, zinc, aluminum, zirconium, niobium, molybdenum, ruthenium, rhodium, palladium, hafnium, tantalum, tungsten, rhenium, osmium, iridium and platinum. The anion of the salt is preferably a halogen such as bromine, iodine, or chlorine but also can be sulfate, nitrate, phosphate, borate, acetyl acetonate, oxide, and the like. In fact, substantially any anion can be employed in order to provide adequate solubility to the promoting salt.

In general, the relative amounts of the coupling agent and promoting salt are in the range 0.01 to 100 parts by weight promoting salt per part of coupling agent, preferably 0.1 to 10 parts promoting salt per part of coupling agent and most desirably 1 to 5 parts promoting salt per part of coupling agent. The coupling agent can be added to the reaction together with the promoting salt, or alternatively the promoting salt can be generated in situ through reaction of a portion of the coupling metal or compound. It should be noted that in many instances during the course of the coupling reaction the coupling agent itself reacts to form further quantities of promoting salt. In the case of metallic iron, for example, during the reductive coupling the Fe° reacts to form $FeX_2$, the latter being an effective promoting salt. It will thus be apparent that the ratio of coupling agent to promoting salt generally undergoes a continuous change during a batch reaction as the coupling agent is progressively reacted. The above described ratios of coupling agent and promoting salt refer to the ratios present in the reaction system during at least a predominance of the coupling of the halo-organic compound, i.e., during at least 50 percent of the coupling, preferably at least 70 percent and most desirably at least 90 percent of the coupling.

Insofar as the coupling agent is concerned, by far the most preferred practice of the invention involves the use of metallic iron, chromium, cobalt, nickel, silver or copper as the coupling agent. Iron and copper are most preferred. Still further, it is preferred but not essential that these be added in finely divided form, for example, as metal powder, although the metals in bulk form e.g., as sheets or large particles has also been found effective in the process of the invention. The metals can also be formed in situ as by decomposition of a precursor compound.

As will be seen from subsequent data, all coupling agents and promoting salts do not have equivalent utility. Various of the coupling agents have high activity and can be used with all of the promoting salts whereas some coupling agents are less active and should only be employed in combination with the more active promoting salts. For example, the more active coupling agents are chromium, manganese, iron, cobalt, nickel, zinc cadmium, indium and tellurium as metals or zero valent compounds, or in the case of chromium also as $Cr^{+2}$ compounds. These coupling agents can be used with any of the listed promoting salts. The less active coupling agents are copper, silver, mercury, thallium, tin, lead, antimony, bismuth, titanium and vanadium as metals or zero valent compounds, or in the case of Ti and V as $Ti^{+2}$ or $V^{+2}$ compounds. These coupling agents should only be employed in combination with the more active promoting salts which are salts of lithium, magnesium, titanium, zirconium, vanadium, chromium, manganese, iron, cobalt, nickel and aluminum.

In appropriate practice of the present invention, mixtures of the coupling agents including alloys can be together with one or a mixture of the promoting salts.

The coupling agent and promoter is incorporated in the reaction system in sufficient amount to provide for the desired reductive coupling. By reductive coupling as used in the present specification and claims is meant a coupling of two molecules of the halo organic compound by the displacement of the halogens and the attachment of the carbons which contained these halogens to one another. Where a single halo organic compound is employed, the coupled product will represent a reduced dimer of the precursor of the halo organic compound. Where a mixture of different halo organic compounds is employed the coupled product will represent a mixture of dimers of the precursors of each of the halo compounds as well as co-dimers.

D. Coupling Reaction Conditions

The reductive coupling is carried out in liquid phase with the total system pressure being sufficient to maintain the liquid phase, e.g., 0.1 to about 4000 atmospheres, preferable 1 to about 100 atmospheres. Preferably oxygen is excluded and an inert atmosphere is employed, e.g., $N_2$, argon, $CO_2$, helium or the like. With carbonyl compound catalysts, however, a CO atmosphere is preferred.

The reaction temperature can range from 50° to 250° C. desirably from 80° to 200° C. and preferably from 100° to 175° C. The reaction time is sufficient to achieve the desired conversion and suitable reaction times range from 1 minute to about 50 hours, desirably 30 minutes to 40 hours, and preferably 2 to 20 hours.

In an especially preferred practice of the invention, the precursor which, upon addition of hydrogen halide, forms the functionally substituted halo organic compound is incorporated in the reaction system.

For example, in the case of 3-halopropionitrile, it is advantageous to incorporate acrylonitrile in the reaction system to reduce propionitrile make.

Solvents can be employed with materials which are formed during the reaction being preferred. For example, adiponitrile or propionitrile are preferred solvents in the coupling of 3-halopropionitrile. Other solvents can, however, be employed as illustrated by benzene, acetonitrile, acetic acid, ethyl acetate, chlorobenzene, benzonitrile, heptane, dimethyl formamide, dioxane, cyclohexane, tetrahydrofuran triethylene glycol, and the like. Preferably the reaction mixture is maintained substantially anhydrous.

Suitable mixtures for accomplishing the reductive coupling may have the following illustrative composition by weight on a coupling composition free basis:

| | Broad | Desired | Preferred |
|---|---|---|---|
| Halo organic compound | 10-100% | 20-99% | 50-98% |
| Halo organic compound precursor | 0-90% | 1.0-80% | 2-50% |
| Solvent | 0-90% | 0-40% | 0-10% |

Where the unsaturated precursor of the halo organic compound is employed in the reaction mixture, it is frequently advantageous to employ polymerization inhibitors in order to prevent polymer formation. These inhibitors do not interfere with the coupling reactions and do effectively suppress the formation of polymer. Illustratively, the inhibitors are used in amounts ranging from about 0.01 to 10 percent by weight based on said unsaturated precursor. Specific examples of inhibitors include hydroquinone, methylene blue, p-nitrosodimethyl aniline, methoxyphenol, di-t-butyl para cresol, and the like.

F. Product Mixture Separation

The coupling reaction can be carried out in accordance with continuous or batch procedures.

In batch procedures, the reagents are charged to the reaction zone and the reagent mixture is heated to reaction temperature for the desired reaction time.

In continuous procedures one or a series of zones can be employed maintained at essentially steady state reaction conditions. Reagents are continuously added and reaction mixture continuously withdrawn.

In each of the above procedures, the reaction mixture contains the coupled product, i.e.,

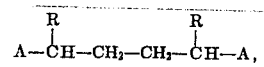

the reacted coupling agent in the form of the halide, e.g.,

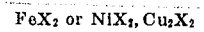

as well as the promoting salt and may contain solvent, unreacted halocompound and/or coupling agent, the unsaturated halocompound precursor, as well as a small amount of by-product.

In one suitable operation, the reaction mixture is resolved by fractional distillation. The organic components are separated one from the other by fractional distillation in one or a series of columns. Since the reaction mixture contains the coupling agent in the form of the halide and may contain some polymer scraped surface vacuum apparatus are appropriate for separate volatiles from solids in the reaction mixture. The solids can be discarded or can be worked by known procedures for the recovery of coupling agent and halide values.

In another suitable operation, the reaction mixture can be resolved by extraction and distillation procedures. For example, the reaction mixture can be contacted with water and the resulting mixture phase separated into an organic phase containing the bulk of the organic constituents and an aqueous phase containing the reacted coupling agent and promoting salt. The aqueous phase will contain some organics and these can be recovered by stripping and/or extraction as with benzene or the like solvent. The salts are recovered by conventional procedures and the reacted coupling agent can be converted to HX and coupling agent by known procedures. The organics are readily resolved by fractional distillation.

Other techniques will be apparent and can be employed.

Adiponitrile Production

The present invention is especially useful for the production of adiponitrile and exceedingly high reaction selectivities and yields can be achieved.

In this embodiment of the invention the halo organic compound is 3-bromopropionitrile, 3-chloropropionitrile or 3-iodopropionitrile, or mixtures. The bromo compound is preferred. As to the coupling agent, metallic iron or copper in finely divided form is preferred in combination with an appropriate promoting salt.

In a first step, hydrogen halide is passed into liquid acrylonitrile until hydrogen halide absorption substantially ceases. The resulting 3-halopropionitrile is employed in the coupling reactions described below.

In one practice, the 3-halopropionitrile and coupling agent and promoting salt are charged to the reactor, heated to the suitable reaction temperature, and maintained at reaction temperature until completion of the reaction whereupon the mixture is separated by distillation and/or extraction procedures to recover product. In this technique acrylonitrile is advantageously added with the 3-halopropionitrile to enhance the selectivity to the desired adiponitrile. The coupling agent in halide compound form may be recovered and discarded or converted to its original form for reuse, while the promoting salt can be recovered for reuse.

In an alternative practice, the process is carried out in accordance with continuous procedures. A reactor is charged with 3-halopropionitrile, acrylonitrile and coupling composition and heated to reaction temperature. Acrylonitrile, and 3-halopropionitrile and coupling composition are added continuously and liquid reaction mixture is continuously removed. The liquid reaction mixture is separated by distillation and/or extraction with recycle or halopropionitrile, and acrylonitrile, recovery of product adiponitrile, and discard or recovery, regeneration and recycle of coupling agent and promoting salt.

Other procedures will be apparent to those skilled in the art and such alternatives can be used. For example, the halo organic compound which is coupled need not be added as such but can be formed in situ as by the reaction of hydrogen halide and appropriate precursor.

In the following examples, which are intended to illustrate the invention, unless otherwise indicated parts indicate parts by weight.

EXAMPLE 1

Preparation of Adiponitrile from Acrylonitrile

Acrylonitrile (2,800 gms.) is charged to a 5 liter 3 necked flask equipped with a stirrer, condenser and a gas inlet tube. Anhydrous hydrogen bromide is fed into the acrylonitrile, with external cooling, at a fast enough rate so as to maintain a temperature of 15° to 25° C. Hydrogen bromide absorption ceases after about 3 hours. The solution is then distilled through a 20 plate 1" Oldershaw column at a reflux ratio of 3/1, 10 mmHg. The product cut distills at 75°–76° C., and 3-bromoproprionitrile product is recovered in 96 percent yield.

A portion of the resultant 3-bromopropionitrile, 110g, is charged with 12g iron powder, 24g ferrous bromide and 6.4g acrylonitrile (containing 0.2g methylene blue) into a 500 cc glass autoclave under nitrogen flush. The autoclave is pressurized with 50 psig of nitrogen and heated with agitation for 6 hours at 150° C. After cooling to room temperature 360 cc distilled water is added and the mixture is agitated for 0.5 hours and then separated into aqueous and organic phases. The aqueous phase is extracted three times with 40 cc 3-bromopropionitrile and the extracts combined with the organic phase.

The organic phase is analized by g.l.c. and contains 16g adiponitrile and 2g propionitrile.

Essentially all the iron salt is in the aqueous phase. The conversion of iron is 100 percent and the adiponitrile yield based on reacted iron is about 70 mole percent.

The organic phase is distilled through a Vigreux column (1/2 inch × 16 inches) at 200 mmHg and at a reflux ratio of 5/1 to remove propionitrile and acrylonitrile then at 10 mmHg to recover 3-bromopropionitrile (head temperature of 75° C.) and finally at 2 mmHg to recover adiponitrile (head temperature of 136°–140° C). The in hand yield of adiponitrile is 96 percent of the amount found by analysis in the organic layer.

From carbon analysis of the distillation residue and by-product analysis the 3-bromopropionitrile conversion is calculated to be 52 percent and the selectivity to adiponitrile based on converted 3-bromopropionitrile is 80 mole percent.

Example 1 a 125g 3-bromopropionitrile (prepared according to example 1), 12.5g acrylonitrile (containing 0.01g hydroquinone), 188g benzonitrile, 59g copper powder and 12.5g ferrous bromide are charged into a 1000 cc glass autoclave under nitrogen flush. The autoclave is then pressurized with 50 psig nitrogen and heated with agitation for 6 hours at 160° C. After cooling to room temperature 150 cc of 2 percent HBr in water and 100 cc 3-bromopropionitrile are added and the mixture is agitated for 0.5 hour. The mixture is filtered to recover unreacted copper which is washed with 3-bromopropionitrile and water. The filtrate and the washings are combined with the resulting mixture is separated into aqueous and organic phase. The aqueous phase is extracted three times with benzonitrile and the extracts combined with the organic phase. Essentially all ferrous bromide is in the water phase, while the bulk part of the cuprous bromide formed during the coupling reaction is in the organic phase.

The conversion of copper is 63 percent. The organic phase is stripped to residue in a rotary-evaporator at 2 mmHg pressure at an end stripping temperature of 220° C. The residue is found by analysis to contain cuprous bromide and a small part of organic by-products. A portion of the overhead is analized by g.l.c. for reaction products. Another portion is fractionated through a Vigreax column at reduced pressure. Pure adiponitrile is recovered at a head temperature of 136°–140° C. and 2 mmHg pressure.

The in hand yield of adiponitrile is 97% of the amount found by g.l.c. analysis.

The yield of adiponitrile based on converted copper is 75 mole %. From carbon analysis of distillation residue and by-product analysis the selectivity to adiponitrile based on converted 3-bromopropionitrile is 84%.

EXAMPLE 2

Preparation of Adiponitrile from Acrylonitrile

Acrylonitrile (2,800 grams) is charged to a 5 liter 3 necked flask equipped with a stirrer, condenser, and a gas inlet tube. Anhydrous hydrogen chloride is fed into the acrylonitrile, with external cooling, at a fast enough rate so as to maintain the temperature at 20° C. An approximately 90 percent conversion of acrylonitrile is obtained in about 4 hours. The solution is distilled at 200 mmHg in a 20 plate 1 inch Oldershaw column at a reflux ratio of 2/1, under nitrogen to remove unreacted acrylonitrile. The distillation is continued at 10 mmHg to recover 3-chloropropionitrile, at a head temperature of 65°–68° C., in an 82 percent yield.

A portion of the resultant 3-chlororpropionitrile, 500g, is charged with 40g powdered iron, 90g ferrous bromide and 50g acrylonitrile (containing 0.1g hydroquinone) into a one liter glass lined autoclave. After pressurizing the vessel with 250 psig nitrogen at room temperature the mixture is heated with agitation for 6 hours at 175° C., cooled to room temperature and then agitated for 0.5 hour with an equal volume of water. The mixture is extracted with 300 cc of ether.

Essentially all iron salts is found by analysis to be in the aqueous layer in the form of ferrous salts. The iron conversion is 100 percent.

The organic layer is distilled at atmospheric pressure in a Vigreux column (1/2 inch × 16 inches) and a reflux ratio of 3/1 to recover ether, at 200 mmHg to recover propionitrile and acrylonitrile, at 10 mmHg to recover 3-chloropropionitrile (head temperature 65°–69° C.) and at 2 mmHg to recover adiponitrile (head temperature 136°–139° C.).

From a carbon analysis of the residue, product and by-product analyses in both water and organic layers, it is shown that the adiponitrile selectivity is 70 mole percent based on a 26 percent conversion of 3-chloropropionitrile.

EXAMPLE 3

A series of coupling runs are made using the following general procedure:

The reactions are carried out in glass. Each glass reactor is charged with the designated materials and heated to the indicated reaction temperature where it is maintained for the specified time. Each mixture is then cooled and analyzed for the adiponitrile and propionitrile content which is a reliable measure of the reaction selectivity. It should be kept in mind that these examples are designed to demonstrate the effect of various reagents and reaction conditions and do not represent optimized operations from the yield or conversion viewpoint. The 3-bromopropionitrile and 3-chloropropionitrile used are prepared as described in Examples 1 and 2 respectively. The results are given in the following table, wherein parts are by weight:

| Run No. | Bromopropionitrile, pts. | Acrylonitrile, pts. | Coupling composition | | | Temp., °C. | Time, hrs. | Coupling metal conversion, percent | Conversion to adiponitrile, percent based on coupling metal |
| --- | --- | --- | --- | --- | --- | --- | --- | --- | --- |
| | | | Metal | Pts. | Salt | Pts. | | | |
| 1 | 292 | 8 | Fe | 20 | VBr$_3$ | 81 | 150 | 1 | 95.0 | 12.4 |
| 2 | 292 | 8 | Fe | 20 | CuBr$_2$ | 62 | 150 | 1 | 85.0 | 17.5 |
| 3 | 292 | 8 | Fe | 20 | NiBr$_2$ | 61 | 150 | 1 | 75.0 | 47.5 |
| 4 | 292 | 8 | Fe | 20 | FeBr$_3$ | 83 | 150 | 1 | 93.0 | 36.0 |
| 5 | 292 | 8 | Fe | 20 | ZnBr$_2$ | 63 | 150 | 1 | 55.0 | 21.3 |
| 6 | 292 | 8 | Fe | 20 | CrBr$_3$ | 81 | 150 | 1 | 100.0 | 55.0 |
| 7 | 292 | 8 | Fe | 20 | CoBr$_2$ | 60 | 150 | 1 | 30.0 | 20.6 |
| 8 | 292 | 8 | Fe | 20 | MnBr$_2$ | 60 | 150 | 1 | 50.0 | 25.8 |
| 9 | 292 | 8 | Fe | 20 | NH$_4$Br | 25 | 150 | 1 | 65.0 | 28.1 |
| 10 | 292 | 8 | Fe | 20 | (C$_2$H$_5$)$_4$NB$_1$ | 58 | 150 | 1 | 80.0 | 17.6 |
| 11 | 292 | 8 | Cu | 20 | FeBr$_2$ | 60 | 150 | 3 | 80.0 | 44.0 |
| 12 | 292 | 8 | Cu | 20 | FeBr$_3$ | 83 | 150 | 3 | 90.0 | 29.7 |
| 13 | 292 | 8 | Cu | 20 | CrBr$_3$ | 81 | 150 | 3 | 100.0 | 39.4 |
| 14 | 292 | 8 | Cu | 20 | LiBr | 24 | 150 | 3 | 60.0 | 25.4 |
| 15 | 292 | 8 | Cu | 20 | FeBr$_2$, CrBr$_3$ | 30/40 | 150 | 3 | 100.0 | 46.5 |
| 16 | 292 | 8 | Fe | 20 | FeBr$_2$ | 60 | 150 | 3 | 100.0 | 67.5 |
| 17 | 292 | 8 | Cr | 20 | FeBr$_2$ | 60 | 150 | 3 | 82.5 | 79.5 |
| 18 | 292 | 8 | Ni | 20 | FeBr$_2$ | 60 | 150 | 3 | 60.0 | 64.0 |
| 19 | 292 | 8 | Mn | 20 | FeBr$_2$ | 60 | 150 | 3 | 100.0 | 9.1 |
| 20 | 292 | 8 | Co | 20 | FeBr$_2$ | 60 | 150 | 3 | 81.5 | 51.2 |
| 21 | 292 | 8 | Ag | 10 | FeBr$_2$ | 60 | 150 | 3 | 55.0 | 59.0 |
| 22 | 292 | 8 | Cd | 10 | FeBr$_2$ | 60 | 150 | 3 | 100.0 | 26.0 |
| 23 | 292 | 8 | Zn | 10 | FeBr$_2$ | 60 | 150 | 3 | 90.0 | 27.5 |
| 24 | 292 | 8 | Bi | 10 | FeBr$_2$ | 30 | 150 | 3 | 90.0 | 45.0 |
| 25 | 292 | 8 | Sb | 10 | FeBr$_2$ | 30 | 150 | 3 | 65.0 | 18.1 |
| 26 | 292 | 8 | Sn | 10 | FeBr$_2$ | 30 | 150 | 3 | 99.0 | 38.0 |
| 27 | 292 | 8 | Fe | 20 | FeBr$_2$ | 60 | 150 | 1 | 95.0 | 48.0 |
| 28 | 292 | 8 | Fe | 20 | FeBr$_3$ | 83 | 150 | 1 | 75.0 | 21.3 |
| 29 | 292 | 8 | Fe | 20 | Fe$_2$O$_3$ | 22 | 150 | 1 | 80.0 | 13.0 |
| 30 | 292 | 8 | Fe | 20 | FeCl$_3$ | 45 | 150 | 1 | 75.0 | 25.0 |
| 31 | 292 | 8 | Fe | 20 | Fe$^o$ | 100 | 150 | 1 | 97.0 | 45.5 |
| 32 | 292 | 8 | Fe | 20 | FeSO$_4$ | 42 | 150 | 1 | 70.0 | 10.4 |
| 33 | 292 | 8 | Cr | 20 | FeBr$_2$ | 60 | 150 | 3 | 82.5 | 79.5 |
| 34 | 292 | 8 | Cr | — | FeBr$_3$ | 83 | 150 | 3 | 95.0 | 61.0 |
| 35 | 292 | 8 | Cr | 20 | CrBr$_3$ | 81 | 150 | 3 | 100.0 | 57.0 |
| 36 | 292 | 8 | Cr | 20 | LiBr | 24 | 150 | 3 | 100.0 | 53.5 |
| 37 | 292 | 8 | Fe | 10 | FeBr$_2$ | 60 | 150 | 0.5 | 50.0 | 40.8 |
| 38 | 292 | 8 | Fe | 30 | FeBr$_2$ | 60 | 150 | 0.5 | 36.0 | 24.4 |
| 39 | 292 | 8 | Fe | 20 | FeBr$_2$ | 40 | 150 | 0.5 | 27.0 | 29.5 |
| 40 | 292 | 8 | Fe | 20 | FeBr$_2$ | 40 | 150 | 1.0 | 63.0 | 39.4 |
| 41 | 292 | 8 | Fe | 20 | FeBr$_2$ | 40 | 150 | 1.5 | 99.0 | 57.7 |
| 42 | 292 | 8 | Fe | 20 | FeBr$_2$ | 40 | 150 | 2.0 | 100.0 | 63.5 |
| 43 | 292 | 8 | Fe | 20 | FeBr$_2$ | 40 | 150 | 3.0 | 100.0 | 65.5 |
| 44 | 292 | 8 | Fe | 20 | FeBr$_2$ | 40 | 150 | 17.0 | 100.0 | 65.5 |
| 45 | 292 | 8 | Fe | 20 | FeBr$_2$ | 10 | 150 | 0.5 | 24.0 | 18.1 |
| 46 | 292 | 8 | Fe | 20 | FeBr$_2$ | 10 | 150 | 1.0 | 61.0 | 25.9 |
| 47 | 292 | 8 | Fe | 20 | FeBr$_2$ | 10 | 150 | 2.0 | 100.0 | 34.5 |
| 48 | 292 | 8 | Fe | 20 | FeBr$_2$ | 60 | 160 | 0.5 | 70.0 | 45.5 |
| 49 | 292 | 8 | Fe | 20 | FeBr$_2$ | 60 | 160 | 1.0 | 98.0 | 51.8 |
| 50 | 292 | 8 | Fe | 20 | FeBr$_2$ | 60 | 160 | 1.5 | 100.0 | 54.5 |
| 51 | 292 | 8 | Fe | 20 | FeBr$_2$ | 60 | 160 | 2.0 | 100.0 | 56.2 |
| 52 | 292 | 8 | Fe | 20 | FeBr$_2$ | 60 | 160 | 6.0 | 100.0 | 58.0 |
| 53 | 308 | — | Fe | 20 | FeBr$_2$ | 60 | 150 | 1.0 | 81.0 | 61.5 |
| 54 | 292 | 8 | Fe | 20 | FeBr$_2$ | 60 | 150 | 1.0 | 95.0 | 48.0 |
| 55 | 276 | 16 | Fe | 20 | FeBr$_2$ | 60 | 150 | 1.0 | 93.0 | 49.5 |
| 56 | 243 | 32 | Fe | 20 | FeBr$_2$ | 60 | 150 | 1.0 | 79.0 | 69.5 |
| 57 | 211 | 48 | Fe | 20 | FeBr$_2$ | 60 | 150 | 1.0 | 66.0 | 29.4 |
| 58 | 162 | 72 | Fe | 20 | FeBr$_2$ | 60 | 150 | 1.0 | 46.0 | 32.3 |
| 59 | 113 | 96 | Fe | 20 | FeBr$_2$ | 60 | 150 | 1.0 | 30.0 | 42.8 |
| 60 | 292 | 8 | Hg | 100 | FeBr$_2$ | 30 | 150 | 3 | 10.0 | 75.0 |
| 61 | [1] 204 | 8 | Cu | 50 | FeBr$_2$ | 30 | 175 | 6 | 60.0 | 55.0 |
| 62 | 292 | 8 | Cu | 20 | (C$_6$H$_5$)$_3$HPBr | 95 | 150 | 3 | 70.0 | 51.0 |
| 63 | [2] 100 | [3] 10 | Cu | 10 | FeBr$_2$ | 30 | 150 | 3 | 45.0 | [4] 20.0 |
| 64 | [5] 100 | [6] 10 | Cu | 10 | FeBr$_2$ | 30 | 150 | 3 | 60.0 | [7] 50.0 |
| 65 | 292 | 8 | CrI$_2$ | 50 | FeBr$_2$ | 60 | 150 | 3 | — | 48.0 |
| 66 | 146 | 8 | Cr | 10 | — | — | 150 | 3 | L 2 | — |
| 67 | 146 | 8 | Co | 10 | — | — | 150 | 3 | L 5 | ([8]) |

Table — Continued

| Run No. | Bromo-propio-nitrile, pts. | Acrylo-nitrile, pts. | Metal | Coupling composition Pts. | Salt | Pts. | Temp., °C. | Time, hrs. | Coupling metal conversion, percent | Conversion to adiponitrile, percent based on coupling metal |
|---|---|---|---|---|---|---|---|---|---|---|
| 68 | 146 | 8 | Ni | 10 | | | 150 | 3 | L 5 | (8) |
| 69 | 146 | 8 | Cu | 10 | | | 150 | 3 | 9 | (8) |
| 70 | 146 | 8 | Ag | 10 | | | 150 | 3 | L 2 | (8) |
| 71 | 146 | 8 | Cd | 10 | | | 150 | 3 | 10 | (8) |
| 72 | 146 | 8 | Zn | 10 | | | 150 | 3 | r 90 | (8) |
| 73 | 292 | 8 | Fe | 20 | | | 150 | 3 | 63 | 42 |
| 74 | 292 | 8 | Fe | 20 | FeBr₂ | 10 | 150 | 3 | 100 | 55.4 |
| 75 | 292 | 8 | Fe | 20 | FeBr₂ | 20 | 150 | 3 | 100 | 61.0 |
| 76 | 292 | 8 | Fe | 20 | FeBr₂ | 40 | 150 | 3 | 100 | 65.4 |
| 77 | 292 | 8 | Fe | 20 | FeBr₂ | 60 | 150 | 3 | 100 | 67.5 |
| 78 | 292 | 8 | Cu | 20 | Cu₂Br₂ | 62 | 150 | 3 | | (8) |

1 3-chloropropionitrile.
2 3-bromopropionic acid.
3 Acrylic acid.
4 Conversion to adipic acid.
5 3-bromopropionic acid ethyl ester.
6 Ethyl acrylate.
7 Conversion to adipic acid di ethyl ester.
8 At most, only trace formation of adiponitrile.
9 Acetylacetonate.

From the above data, it can be seen that extremely good results are achieved through practice of the present invention.

Runs 1 through 10, 16, 27, 28, 37 through 59 and 74 through 77 demonstrate the utility of a considerable number of promoting salt bromides used in combination with metallic iron as coupling agent. It can be seen that particularly outstanding results are achieved with the chromium bromide and iron bromide promoting salts.

Runs 11 through 15, and 61 – 62 describe the advantageous results achieved using various active bromide promoting salts with metallic copper as coupling agent. Once again superior results are achieved with systems involving the use of chromium and iron promoting salts. Run 69 is presented for comparison and demonstrates that copper alone is not an effective coupling agent. Run 78 is also presented for comparison and shows that copper promoted with cuprous bromide is not a good coupling composition.

Run 16 illustrates an especially advantageous practice of the invention employing iron as coupling agent and iron promoting salt. Runs 17 through 26 and 60 demonstrate the usefulness of a considerable number of coupling agents when used in combination with the promoting salt, in this case iron bromide. For purposes of comparison, runs 66 – 72 indicate the ineffectiveness of various of the coupling agents where no promoting salt is used.

Runs 27 through 32 amply demonstrate that promoting activity is obtained with promoting salts with a wide range of anions. Runs 33 through 36 demonstrate that chromium in combination with various promoting salts represents an exceedingly effective coupling system.

Runs 37 and 38 are presented to demonstrate the importance of having fairly high quantities of the promoting salt relative to the coupling metal. For example, in run 37 substantially improved results are achieved as compared to run 38 in the system involving a considerably higher relative amount of the promoting salt. Likewise, runs 73 – 77 clearly demonstrate the effect of varying amounts of promoting salts (Fe Br₂) on the coupling selectivity and conversion using iron as coupling agent. In general, both high conversions and higher selectivities are obtained with increasing amounts of the promoting salt.

Runs 39 through 44 illustrate the effect of reaction time upon the coupling system, showing that higher conversions and selectivities are obtained at longer reaction times.

Likewise, runs 45 through 47 also illustrate the effect of time where a system involving different relative amounts of coupling metal and promoting salt. This set of runs can be compared to the preceding set of runs and the advantages of the use of increased amounts of promoting salt become quite clear.

Runs 48 through 52 further illustrate the effect of reaction time.

Runs 53 through 59 demonstrate that it is advantageous to employ the unsaturated monomer, in this case acrylonitrile, in the coupling system but that high amounts should be avoided.

Run 61 shows coupling of 3-chloropropionitrile using the Cu - Fe Br₂ system.

Run 63 shows the production of adipic acid by coupling 3-bromopropionic acid in accordance with the invention.

Run 64 shows the production of the diethyl ester of adipic acid by coupling the ethyl ester of 3-bromopropionic acid by the invention.

Run 65 shows a $Cr^{+2}$ compound as coupling agent according to the invention.

It is readily seen from the above data that real and important improvements in the coupling of organic compounds such as the halopropionitriles can be achieved through the provision in accordance with this invention of the novel coupling composition comprising as the essential components thereof the coupling agent, preferably iron or copper, in combination with the promoting salt, most preferably salts of iron, nickel and chromium with especially advantageous results being achieved through the use of the halo salts.

I claim:

1. The method of producing a compound having the formula

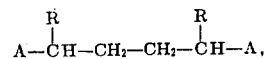

wherein A is

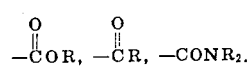

and R is H or lower alkyl which comprises coupling in the liquid phase at a temperature in the range 50°–250° C. a compound having the formula

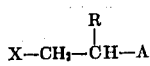

wherein R and A are as above and X is bromine, chlorine or iodine in the presence of a coupling composition consisting essentially of a coupling metal selected from the group consisting of Cr, Mn, Fe, Co, Ni, Cu, Zn, Ag, Cd, In, Sn, Sb, Te, Hg, Tl, Pb, and Bi or a zero valent compound thereof or a Cr, Ti or V plus 2 valent compound and a promoting salt from the group Li, Mg, Ti, V, Cr, Mn, Fe, Co, Ni, Cu, Zn, Al, Zr, Nb, Mo, Ru, Rh, Pd, Hf, Ta, W, Re, Os, Ir, Pt, ammonium, phosphonium, alkyl ammonium and alkyl phosphonium salts, the ratio by weight of said coupling agent to said promoting salt being in the range 0.01 to 100 parts promoting salt per part coupling agent.

2. The method of producing a compound having the formula

wherein A is

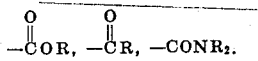

and R is H or lower alkyl which comprises coupling in the liquid phase at a temperature in the range of 50° to 250° C. a compound having the formula

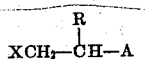

wherein R and A are as above and X is bromine, chlorine or iodine in the presence of a coupling composition consisting essentially of metallic Fe, Cu, Co, Ni, Ag or Cr and a Cr, Fe, Ni or Co promoting salt, the ratio by weight of said coupling agent to said promoting sale being in the range 0.01 to 100 parts promoting salt per part coupling agent.

3. The method of claim 2 wherein the promoting salt is Cr, Fe, Ni or Co halide.

4. The method of producing a compound having the formula

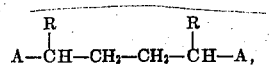

wherein A is

and R is H or lower alkyl which comprises coupling in the liquid phase at a temperature in the range 50°–250° C. a compound having the formula

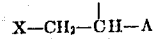

wherein R and A are as above and X is bromine, chlorine or iodine in the presence of a coupling composition consisting essentially of metallic Fe or Cu and a Cr, Fe, Ni or Co promoting salt, the ratio by weight of said coupling agent to said promoting salt being in the range 0.01 to 100 parts promoting salt per part coupling agent.

5. The method of producing a compound having the formula

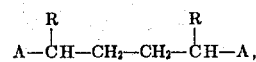

wherein A is

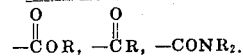

and R is H or lower alkyl which comprises coupling in the liquid phase at a temperature in the range 50°–250° C. a compound having the formula

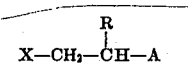

wherein R and A are as above and X is bromine, chlorine or iodine in the presence of a coupling composition consisting essentially of metallic Fe or Cu and a Cr, Fe, Ni or Co halide promoting salt, the ratio by weight of said coupling agent to said promoting salt being in the range 0.01 to 100 parts promoting salt per part coupling agent.

6. The method of claim 1 wherein the coupling composition comprises metallic iron and an iron halide promoting salt.

7. The method of claim 1 wherein the coupling composition comprises metallic iron and a chromium halide promoting salt.

8. The method of claim 1 wherein the coupling composition comprises metallic iron and a nickel halide promoting salt.

9. The method of claim 1 wherein the coupling composition comprises metallic iron and a cobalt halide promoting salt.

10. The method of claim 1 wherein the coupling composition comprises metallic Cu and a chromium halide promoting salt.

11. The method of claim 1 wherein the coupling composition comprises metallic Cu and a nickel halide promoting salt.

12. The method of claim 1 wherein the coupling composition comprises metallic Cu and an iron halide promoting salt.

13. The method of claim 1 wherein the coupling composition comprises metallic Cu and a cobalt halide promoting salt.

* * * * *

UNITED STATES PATENT OFFICE
CERTIFICATE OF CORRECTION

Patent No. 3,759,983         Dated September 18, 1973

Inventor(s) Olav T. Onsager

It is certified that error appears in the above-identified patent and that said Letters Patent are hereby corrected as shown below:

Column 2, line 22, at the beginning, insert "-CN";

Column 2, lines 51 and 52, delete "N27C" and substitute "N≡C";

Column 8, line 28, delete "with" and substitute "and";

Columns 9 and 10, in the Table, for Run 1, the conversion to adiponitrile should be "10.4" instead of "12.4";

For Run 9, the conversion to adiponitrile should be "23.1" rather than "28.1";

For Run 10, under "Salt", "$B_1$" should be "Br" and the conversion to adiponitrile should be "27.6", not "17.6";

For Run 65, the conversion to adiponitrile should be "43.0", not "48.0";

Claims 1, 2 and 5, for each, under the description of "A" the following should be deleted: "—$\overset{O}{\overset{\|}{C}}$R, —$CONR_2$."

Signed and sealed this 16th day of July 1974.

(SEAL)
Attest:

McCOY M. GIBSON, JR.            C. MARSHALL DANN
Attesting Officer               Commissioner of Patents